US009923278B2

(12) United States Patent
Milankovic et al.

(10) Patent No.: US 9,923,278 B2
(45) Date of Patent: Mar. 20, 2018

(54) DIVERSITY ANTENNA ARRANGEMENT FOR WLAN, AND WLAN COMMUNICATION UNIT HAVING SUCH A DIVERSITY ANTENNA ARRANGEMENT, AND DEVICE HAVING SUCH A WLAN COMMUNICATION UNIT

(71) Applicant: DLoG Gesellschaft fur elektronische Datentechnik mbH, Germering (DE)

(72) Inventors: Dejan Milankovic, Munich (DE); Rolf-Gunter Hauk, Frankfurt (DE)

(73) Assignee: DLOG GESELLSCHAFT FUR ELEKTRONISCHE DATENTECHINK MBH, Germering (DE)

( * ) Notice: Subject to any disclaimer, the term of this patent is extended or adjusted under 35 U.S.C. 154(b) by 0 days.

(21) Appl. No.: 14/819,290

(22) Filed: Aug. 5, 2015

(65) Prior Publication Data

US 2016/0072195 A1 Mar. 10, 2016

(30) Foreign Application Priority Data

Aug. 6, 2014 (DE) .................... 20 2014 103 657 U

(51) Int. Cl.

| | |
|---|---|
| ***H01Q 21/00*** | (2006.01) |
| ***H01Q 21/06*** | (2006.01) |
| ***H01Q 1/22*** | (2006.01) |
| ***H01Q 1/42*** | (2006.01) |
| ***H01Q 1/52*** | (2006.01) |
| ***H01Q 21/28*** | (2006.01) |
| ***H04B 7/04*** | (2017.01) |
| ***H01Q 5/371*** | (2015.01) |
| ***H01Q 21/30*** | (2006.01) |

(52) U.S. Cl.

CPC ........... *H01Q 21/06* (2013.01); *H01Q 1/2291* (2013.01); *H01Q 1/42* (2013.01); *H01Q 1/521* (2013.01); *H01Q 1/526* (2013.01); *H01Q 5/371* (2015.01); *H01Q 21/28* (2013.01); *H01Q 21/30* (2013.01); *H04B 7/04* (2013.01)

(58) Field of Classification Search

CPC .......... H01Q 1/526; H01Q 21/30; H01Q 1/42; H01Q 21/28; H01Q 5/371; H01Q 21/06; H01Q 1/2291; H01Q 1/521

See application file for complete search history.

(56) References Cited

U.S. PATENT DOCUMENTS

| | | | | |
|---|---|---|---|---|
| 6,784,844 | B1 * | 8/2004 | Boakes .................. | H01Q 1/242 343/702 |
| 6,985,114 | B2 * | 1/2006 | Egashira ............... | G06F 1/1616 29/600 |
| 8,354,964 | B2 * | 1/2013 | Johnson ................. | H01Q 1/243 343/700 MS |
| 2011/0169703 | A1 * | 7/2011 | Schlub .................. | H01Q 1/243 343/702 |
| 2013/0257674 | A1 * | 10/2013 | Li .......................... | H01Q 5/321 343/853 |
| 2015/0084831 | A1 * | 3/2015 | Liu ........................ | H01Q 21/24 343/893 |

* cited by examiner

*Primary Examiner* — Trinh Dinh

(74) *Attorney, Agent, or Firm* — Workman Nydegger

(57) ABSTRACT

A diversity antenna arrangement, in particular a diversity radio antenna arrangement, for WLAN can have two or more antenna elements. In at least one implementation, the antenna elements are arranged in a manner spatially separate from one another on a printed circuit board.

16 Claims, 2 Drawing Sheets

DIVERSITY ANTENNA ARRANGEMENT FOR WLAN, AND WLAN COMMUNICATION UNIT HAVING SUCH A DIVERSITY ANTENNA ARRANGEMENT, AND DEVICE HAVING SUCH A WLAN COMMUNICATION UNIT

CROSS-REFERENCE TO RELATED APPLICATIONS

The present invention claims the benefit of priority to German Patent Application No. 20 2014 103 657.1 filed Aug. 6, 2014 entitled "Diversity antenna arrangement for WLAN, and WLAN communication unit having such a diversity antenna arrangement, and device having such a WLAN communication unit," the entire content of which is incorporated herein by reference.

BACKGROUND OF THE INVENTION

1. The Field of the Invention

The invention relates to a diversity antenna arrangement, in particular a diversity radio antenna arrangement for WLAN (Wireless Local Area Network). The invention also relates to a WLAN communication unit having such a diversity antenna arrangement and to a device having a communication device, in particular a vehicle terminal, comprising such a WLAN communication unit.

2. Background and Relevant Art

Two frequency bands are currently available for WLAN: 2.4 GHz to 2.5 GHz (2.4 GHz ISM band) and 5.15 GHz to 5.725 GHz (5 GHz ISM band).

Diversity antenna systems are used to ensure a good transmission and reception power in radio networks. These antenna systems have two or more antennas for transmitting and/or receiving radio signals. This reduces interference, for example interference effects during radio transmission, caused by reflection of the radio waves.

There is generally the requirement for devices for wireless communication to become smaller and smaller. Therefore, it is known practice to arrange the antenna elements on a printed circuit board. However, there is the risk of wave coupling with such a design.

BRIEF SUMMARY OF THE INVENTION

The present invention is therefore based on the object of specifying a new antenna arrangement which has a high degree of decoupling. The intention is also to specify a WLAN communication unit having such a diversity antenna arrangement and a device having such a WLAN communication unit, in particular a vehicle terminal.

This object is achieved, with respect to the diversity antenna arrangement, by the features of claim 1, with respect to the WLAN communication unit, by the features of claim 12, and, with respect to the device, by the features of claim 18. Advantageous configurations and developments are specified in the respective dependent claims.

The diversity antenna arrangement according to the invention, in particular the diversity radio antenna arrangement, for WLAN has two or more antenna elements. The latter are arranged in a manner spatially separate from one another on a printed circuit board.

Arranging two or more antenna elements on a printed circuit board in such a manner that the antenna elements are spatially separate from one another makes it possible to achieve a particularly high degree of decoupling between the individual antennas. The advantages of the invention therefore lie, in particular, in the compact dimensions and a simultaneous high degree of decoupling of the individual antennas. It is also advantageous that such an arrangement can be produced in a comparatively cost-effective manner.

One development of the invention provides for the antenna elements to be formed on a substantially planar surface of the printed circuit board as a metal coating, in particular as a flat metal coating, of the surface, the metal coating preferably being formed by a single-layer copper structure.

Provision may also be made for the antenna elements to be arranged on the printed circuit board at an intended distance from one another, in particular a distance of ⅝ of the wavelength in the 2.4 GHz range or a distance of ¼ of the wavelength in the 5.8 GHz range, preferably a distance of 33 mm. This achieves a high degree of decoupling between the antenna elements.

One configuration provides for a copper structure to be provided between the antenna elements on the printed circuit board, with the result that a high degree of decoupling between the antenna elements is achieved.

One development of the invention provides for the copper structure to be in the form of a T structure and, in order to short-circuit the field lines, to preferably be connected to a retaining bracket which forms a ground, in particular a ground plane, the retaining bracket resting on the copper structure and therefore forming part of the antenna and/or part of the ground plane.

Provision may also be made for the antenna elements to be formed from monopole antennas and F antennas, in particular inverted F antennas.

One embodiment variant of the invention provides for the antenna elements to be in the form of F antennas, a further connection being provided between the two vanes of the F antenna, with the result that a rectangular area enclosed by the antenna structure is produced between the vanes of the F antenna, a recess being provided in the printed circuit board in the region of the rectangular area in order to increase the antenna gain or the efficiency of the antenna.

Another configuration provides for the antenna elements to be in the form of mutual mirror images during reflection at a central axis between them.

According to one development of the invention, the antenna elements are formed and/or tuned in such a manner that they cover all WLAN frequency bands, in particular the frequency ranges of 2.4 GHz to 2.5 GHz and 5.15 GHz to 5.725 GHz or frequency ranges up to 5.805 GHz. A diversity antenna arrangement for WLAN is therefore proposed which, as a result of two or more antenna elements being arranged on a common printed circuit board and as a result of the antenna elements being tuned to at least two different WLAN frequency ranges, covers a plurality of frequency ranges in a very small space.

One configuration of the invention provides for the antenna elements to have cable connections for cables, preferably coaxial cables.

The invention also relates to a WLAN communication unit comprising a diversity antenna arrangement according to the invention. Provision may be made for the WLAN communication unit to comprise the printed circuit board and a retaining bracket, the printed circuit board being arranged on the retaining bracket, in particular being retained by the retaining bracket.

Provision may also be made for the retaining bracket to be provided as ground, in particular as a ground plane, for the antenna elements, the retaining bracket resting on the copper structure and therefore forming part of the antenna and/or part of the ground plane.

The ground connection of the retaining bracket or of the retaining bracket together with a housing and the bandwidth of the antenna (preferably in a range of 500 MHz to 1500 MHz) make the antenna unsusceptible to coverage, for example coverage by the hand of a user or other objects.

Provision may also be made for the retaining bracket to consist of a metal, in particular a sheet metal.

One development of the invention provides for the printed circuit board and the retaining bracket to be provided with a radome (or, covering), preferably a radome made of plastic, the radome enclosing the printed circuit board and the retaining bracket. The antenna is preferably matched to the radome without this resulting in a shift of the resonant frequency.

The invention also relates to a device having a WLAN communication unit according to the invention, as described above. The device may be a vehicle terminal, in particular.

According to one development, the device may comprise a housing, the housing being connected to the retaining bracket and/or the radome of the WLAN communication device.

Provision may also be made for the WLAN communication device to be arranged on the outside of the device in order to achieve a high efficiency, in particular an efficiency in the range of 80% to 97.8%. Antennas inside a device or terminal generally cannot achieve this efficiency. The high efficiency is needed for fast-roaming (rapid change between the access points on a vehicle up to 30 km/h).

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
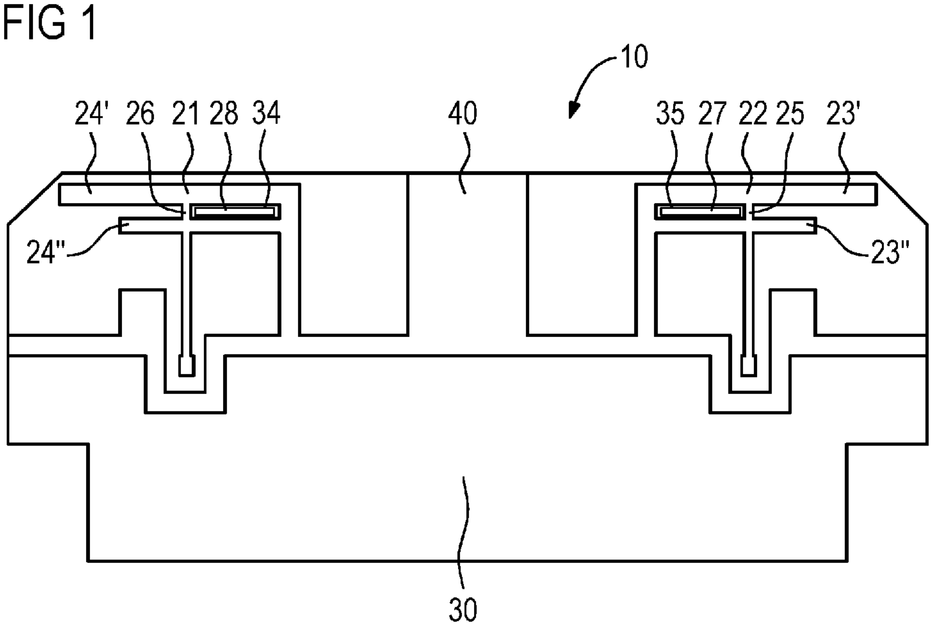
FIG. 1 shows a schematic illustration of an exemplary embodiment of a diversity antenna arrangement for WLAN according to the invention.

FIG. 1 shows a diversity antenna arrangement 10 for WLAN having two antenna elements 21, 22. The antenna elements 21, 22 are arranged in a manner spatially separate from one another on a printed circuit board and are formed on a substantially planar surface of the printed circuit board 30 as a flat metal coating of the surface. The metal coating is formed by a single-layer copper structure. The antenna elements 21, 22 are also in the form of mutual minor images during reflection at a central axis between them.

In order to achieve a high degree of decoupling, the antenna elements 21, 22 are arranged on the printed circuit board 30 at an intended distance from one another, in particular a distance of ⅝ of the wavelength in the 2.4 GHz range or a distance of ¼ of the wavelength in the 5.8 GHz range, preferably at a distance of 33 mm. A copper structure 40 is also provided between the antenna elements 21, 22 on the printed circuit board 30, with the result that a high degree of decoupling between the antenna elements 21, 22 is achieved.

The copper structure 40 is in the form of a T structure for this purpose and, in order to short-circuit the field lines, is preferably connected to a retaining bracket 80 which forms a ground, in particular a ground plane. The retaining bracket 80 rests on the copper structure and therefore forms part of the antenna.

The antenna elements 21, 22 are formed from monopole antennas and inverted F antennas and have cable connections 51, 52 for coaxial cables 61, 62.

The antenna elements 21, 22 in the form of F antennas each have two vanes 23', 23", 24', 24", a further connection 25, 26 being provided between the two vanes 23', 23", 24', 24" of the F antenna, with the result that a rectangular area 27, 28 enclosed by the antenna structure is produced between the vanes 23', 23", 24', 24" of the F antenna, a recess 34, 35 being provided in the printed circuit board 30 in the region of the rectangular area 27, 28 in order to increase the antenna gain or the efficiency of the antenna.

The antenna elements 21, 22 have an omnidirectional radiation? characteristic and are formed and/or tuned in such a manner that they cover the frequency ranges of 2.4 GHz to 2.5 GHz and 5.15 GHz to 5.725 GHz.

Figure 2:
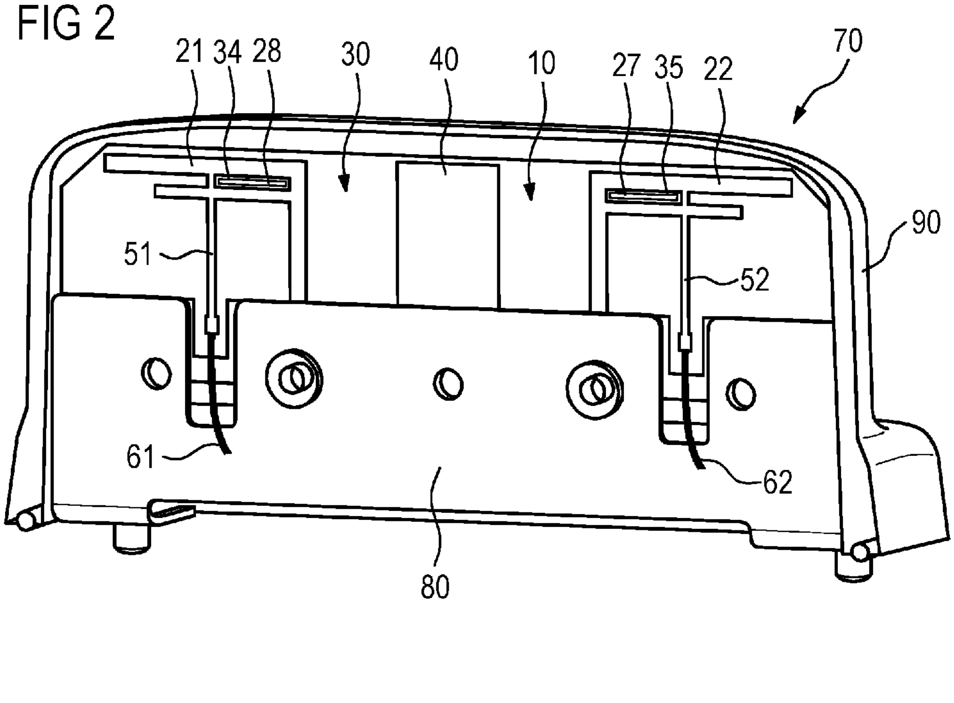
FIG. 2 shows a WLAN communication device having such a diversity antenna arrangement.

FIG. 2 shows a WLAN communication unit 70 comprising a diversity antenna arrangement as described above. The WLAN communication unit 70 comprises the printed circuit board 30 and the retaining bracket 80, the printed circuit board 30 being retained by the retaining bracket 80. The retaining bracket 80 consists of a sheet metal and is provided as a ground plane for the antenna elements 21, 22. The printed circuit board 30 and the retaining bracket 80 are provided with a radome (or, covering) 90 made of plastic, the radome 90 enclosing the printed circuit board 30 and the retaining bracket 80.

Figure 3:
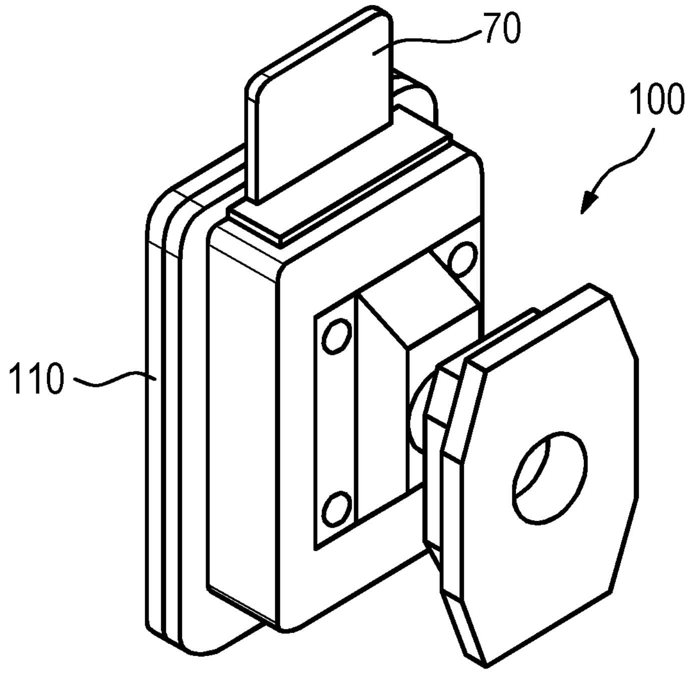
FIG. 3 shows a vehicle terminal having a WLAN communication unit.

FIG. 3 shows a vehicle terminal 100 comprising a WLAN communication unit 70. The device 100 comprises a housing 110, the housing 110 being connected to the retaining bracket 80 and the radome 90 of the WLAN communication device 70.

The WLAN communication device 70 is arranged on the outside of the housing 110 in order to achieve a high efficiency, in particular an efficiency in the range of 80% to 97.8%.

LIST OF REFERENCE SIGNS

10 Diversity antenna arrangement
21 Antenna element
22 Antenna element
23' Vane
23" Vane

24' Vane
24" Vane
25 Connection
26 Connection
27 Area
28 Area
30 Printed circuit board
40 Copper structure
51 Cable connection
52 Cable connection
61 Cable
62 Cable
70 WLAN communication unit
80 Retaining bracket
90 Covering
100 Device
110 Housing

We claim:

1. A diversity antenna arrangement for WLAN having two or more antenna elements;
wherein:
the antenna elements are arranged in a manner spatially separate from one another on a printed circuit board;
the antenna elements are formed on a substantially planar surface of the printed circuit board as a metal coating of the surface;
the antenna elements are formed or tuned in such a manner that they cover all WLAN frequency bands;
the antenna elements are in the form of F antennas with two vanes, a connection being provided between the two vanes of each of the F antennas, so that a rectangular area is enclosed by each of the F antennas, between the vanes of each of the F antennas; and
a recess being provided in the printed circuit board in the region of the rectangular area in order to increase the antenna gain or the efficiency of the antenna.

2. The diversity antenna arrangement as claimed in claim 1;
wherein:
the antenna elements are arranged on the printed circuit board at an intended distance from one another.

3. The diversity antenna arrangement as claimed in claim 1;
wherein:
a copper structure is provided between the antenna elements on the printed circuit board, with the result that a high degree of decoupling between the antenna elements is achieved.

4. The diversity antenna arrangement as claimed in claim 3;
wherein:
the copper structure is in the form of a T structure and
a retaining bracket rests on the copper structure and therefore forms part of the diversity antenna arrangement.

5. The diversity antenna arrangement as claimed in claim 1;
wherein:
the antenna elements are inverted F antennas.

6. The diversity antenna arrangement as claimed in claim 1;
wherein:
the antenna elements are in the form of mutual mirror images during reflection at a central axis between them.

7. The diversity antenna arrangement as claimed in claim 1;
wherein:
the antenna elements have an omnidirectional directional characteristic.

8. The diversity antenna arrangement as claimed in claim 1;
wherein:
the antenna elements have cable connections.

9. A WLAN communication unit comprising a diversity antenna arrangement;
wherein:
the diversity antenna arrangement comprises antenna elements that are arranged in a manner spatially separate from one another on a printed circuit board;
the antenna elements are formed on a substantially planar surface of the printed circuit board as a metal coating of the surface;
the antenna elements are formed or tuned in such a manner that they cover all WLAN frequency bands;
the antenna elements are in the form of F antennas with two vanes, a connection being provided between the two vanes of each of the F antennas, so that a rectangular area is enclosed by each of the F antennas, between the vanes of each of the F antennas; and
a recess being provided in the printed circuit board in the region of the rectangular area in order to increase the antenna gain or the efficiency of the antenna.

10. The WLAN communication unit as claimed in claim 9;
wherein:
the WLAN communication unit comprises the printed circuit board and a retaining bracket, the printed circuit board being arranged on the retaining bracket.

11. The WLAN communication unit as claimed in claim 10;
wherein
the retaining bracket is provided as ground for the antenna elements, the retaining bracket resting on a copper structure of the antenna elements and therefore forming part of the diversity antenna arrangement.

12. The WLAN communication unit as claimed in claim 10;
wherein:
the retaining bracket consists of a metal.

13. The WLAN communication unit as claimed in claim 10;
wherein:
the printed circuit board and the retaining bracket are provided with a radome, the radome enclosing the printed circuit board and the retaining bracket.

14. A device comprising a WLAN communication unit;
wherein:
the WLAN communication unit comprises a diversity antenna arrangement;
the diversity antenna arrangement comprises antenna elements that are arranged in a manner spatially separate from one another on a printed circuit board;
the antenna elements are formed on a substantially planar surface of the printed circuit board as a metal coating of the surface;
the antenna elements are formed or tuned in such a manner that they cover all WLAN frequency bands;
the antenna elements are in the form of F antennas with two vanes, a connection being provided between the two vanes of each of the F antennas, so that a rectangular area is enclosed by each of the F antennas, between the vanes of each of the F antennas; and a recess being provided in the printed circuit board in the region of the rectangular area in order to increase the antenna gain or the efficiency of the antenna.

15. The device as claimed in claim 14;

wherein:

the device comprises a housing, the housing being connected to a retaining bracket and/or a radome of the WLAN communication unit.

16. The device as claimed in claim 15;

wherein:

the WLAN communication unit is arranged on the outside of the housing in order to achieve a high efficiency.

* * * * *